(12) United States Patent
Stenevik

(10) Patent No.: US 10,794,139 B2
(45) Date of Patent: Oct. 6, 2020

(54) UMBILICAL METHOD

(71) Applicant: EQUINOR ENERGY AS, Stavanger (NO)

(72) Inventor: Karl Atle Stenevik, Sandsli (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 16/330,209

(22) PCT Filed: Aug. 31, 2017

(86) PCT No.: PCT/NO2017/050215
§ 371 (c)(1),
(2) Date: Mar. 4, 2019

(87) PCT Pub. No.: WO2018/044177
PCT Pub. Date: Mar. 8, 2018

(65) Prior Publication Data
US 2019/0203553 A1 Jul. 4, 2019

(30) Foreign Application Priority Data
Sep. 5, 2016 (GB) .................................. 1615015.3

(51) Int. Cl.
*F16L 1/26* (2006.01)
*E21B 33/035* (2006.01)
*E21B 33/038* (2006.01)
*E21B 41/00* (2006.01)

(52) U.S. Cl.
CPC ........ *E21B 33/0355* (2013.01); *E21B 33/038* (2013.01); *E21B 41/0007* (2013.01); *F16L 1/26* (2013.01)

(58) Field of Classification Search
CPC .................. F16L 1/12; F16L 1/16; F16L 1/26
USPC ................................................... 405/169–170
See application file for complete search history.

(56) References Cited

U.S. PATENT DOCUMENTS

| 8,141,909 B2 * | 3/2012 | Clover ..................... F16L 1/26 166/363 |
| 2008/0014026 A1 | 1/2008 | Routeau et al. |
| 2011/0033244 A1 * | 2/2011 | Pollack ................... B63B 27/24 405/168.4 |

(Continued)

FOREIGN PATENT DOCUMENTS

| EP | 0 296 137 A1 | 12/1988 |
| GB | 2471091 A | 12/2010 |
| WO | WO 00/26496 A1 | 5/2000 |

(Continued)

OTHER PUBLICATIONS

International Search Report, issued in PCT/NO2017/050215, dated Oct. 19, 2017.

(Continued)

*Primary Examiner* — Sunil Singh
(74) *Attorney, Agent, or Firm* — Birch, Stewart, Kolasch & Birch, LLP

(57) ABSTRACT

A subsea umbilical laying method includes mechanically coupling an umbilical termination assembly at an end of a first umbilical to an umbilical termination assembly at an end of a second umbilical, and subsequently deploying the mechanically coupled ends of the first and second umbilicals together in a subsea umbilical laying process.

9 Claims, 3 Drawing Sheets

(56) References Cited

U.S. PATENT DOCUMENTS

2013/0277060 A1* 10/2013 Critsinelis ............... E21B 43/01
                                                                                              166/345

FOREIGN PATENT DOCUMENTS

WO    WO 2005/028810 A1    3/2005
WO    WO 2017013541 A1 *  1/2017

OTHER PUBLICATIONS

United Kingdom Combined Search and Examination Report, issued in Priority Aplication No. 1615015.3, dated Dec. 20, 2016.
Written Opinion of the International Searching Authority, issued in PCT/NO2017/050215, dated Oct. 19, 2017.

* cited by examiner

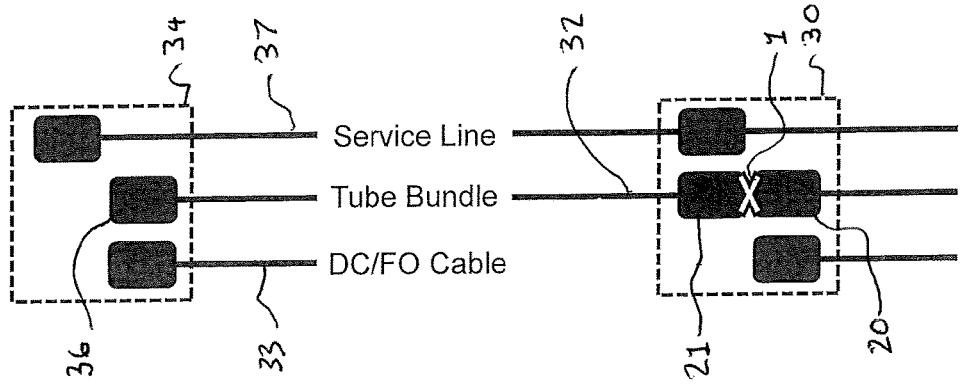
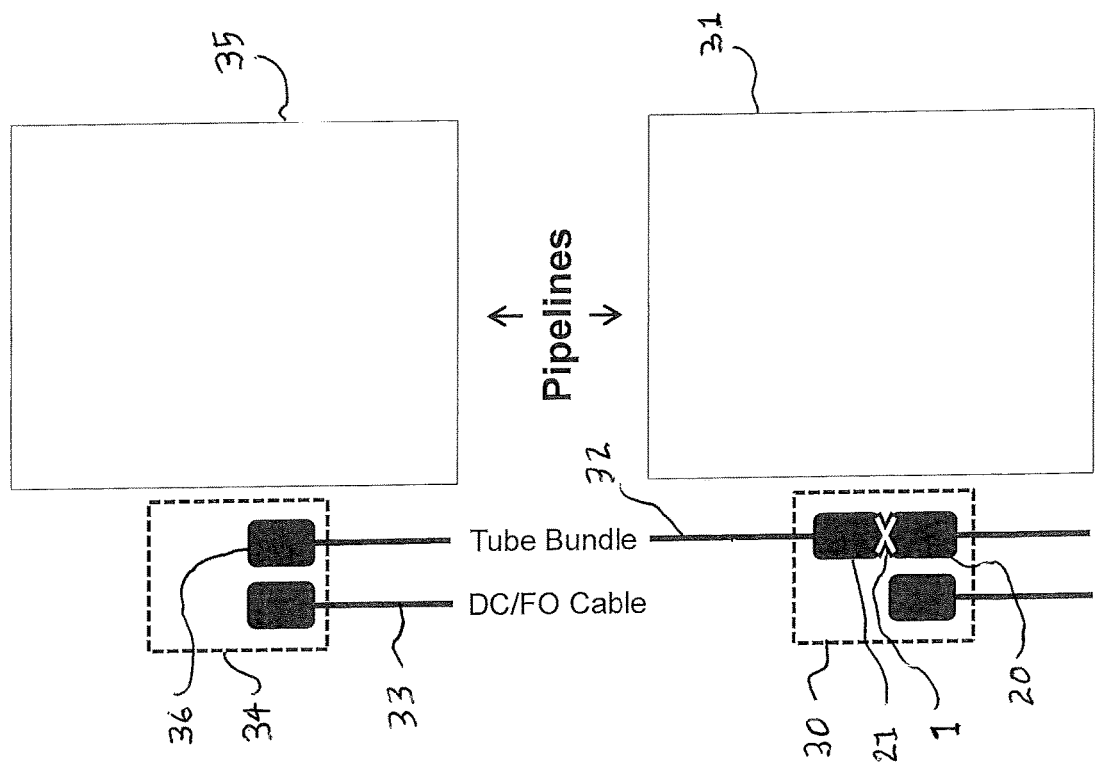

UMBILICAL METHOD

FIELD

The invention relates to laying umbilical for subsea application, in particular, for laying umbilical from a lay vessel for providing utilities to a subsea manifold or template.

BACKGROUND

Subsea umbilical are deployed on the seabed to supply necessary control, energy (electric/hydraulic), and chemicals to subsea oil and gas wells, subsea manifolds and any subsea system requiring remote control. A single umbilical may include control, energy and chemicals in a single cable or hose. Alternatively, the various lines can be provided in separate cables and hoses. For example, the electrical power and fibre optic control lines might be provided in one cable and the hydraulic and/or chemicals might be provided in another cable if required.

In a typical process a subsea umbilical is laid on the sea bed from a topside facility using a lay vessel. In this case the umbilical has a topside umbilical termination unit (TUTU) and a Subsea Umbilical Termination Assembly (SUTA) which has an end termination and, for example, an associated mud mat—other forms of umbilical termination assembly are known. The interface between the umbilical and the termination is comprised typically of an umbilical armour termination and/or a mechanical anchoring device for the tubes, bend stiffener/limiter, and tube or hose-end fittings. If the umbilical contains electric cables/fibre optics, then penetrator(s) and/or connectors may also be incorporated.

The object is to deposit the SUTA near a landing structure on the subsea structure, for example at a subsea distribution unit, production tree or wellhead template. Typically the SUTA is then winched into place for connection to the subsea structure either directly or more typically using Jumpers (Also known as flying leads, such electrical flying leads (EFL) and hydraulic flying leads (HFL)). A pull-in and connection tool is used to complete the connection of the umbilical end termination to the SUTA. A Remotely operated vehicle may be used to establish connection between a pull-in wire of the pull-in and connection tool and a pullhead of the umbilical. The connection tool then connects the umbilical head to for example a stoking hub, including a mechanical lock of the umbilical head to the stoking hub. A connector and seal assembly is then required to connect all the flow lines and electrical/optical lines.

A single SUTA may be connected to multiple well heads via jumpers allowing a single umbilical to provide services to a plurality of subsea control modules via the SUTA.

In order to lay a subsequent umbilical to connect the first subsea structure to a second subsea structure. A new umbilical must be prepared for landing in the correct landing zone and then subsequently winched or otherwise manoeuvred (stroked) into place and finally secured and connected to the subsea structure. Typically, these procedures are separately scheduled tasks. Thus a first umbilical say from the top side to a first subsea structure is installed including laying the umbilical and properly securing and connecting the umbilical ready for use. A separate procedure is then scheduled for the lay vessel to lay a second umbilical from the first structure to the second structure, and so on. Typically, after laying the first umbilical, it connected to the subsea structure before laying of subsequent an umbilical. Final installation (rerouting and tie-in) may be controlled from the lay vessel but is more commonly done from a separate vessel from which a remotely operated vehicle (ROV) is launched. If laying of a second umbilical is required the lay vessel is required to return and lay the second umbilical which may have two subsea ends for connecting the first subsea structure to a second subsea structure. When installing (connecting) the second umbilical, commonly this requires rerouting and tie-in to the subsea structure. The subsea ends of the umbilicals may require wet storage. The ends of one or both umbilicals may need rerouting before tie in.

There are many different techniques for laying and installing subsea umbilicals but all are complex and expensive. Prior techniques require large and complex SUTAs.

Furthermore there is a drive for greater functionality within umbilicals and therefore larger SUTAs. There are pros and cons to including more services into umbilicals and UTAs. Advantages include: a more compact subsea field layout, and the laying of fewer umbilicals and cables. Disadvantages include: higher possibility of umbilcal damage for larger and heavier UTAs, and increased requirements on vessel specification (greater deck space, higher demands on cranes, lower vessel choice flexibility, scheduling delay, increased vessel cost and offshore installation time).

Increased size and weight of UTAs leads to handling difficulties, greater complexity of rigging arrangements, increased requirements for restraint against vessel motions and increased energy imparted by any accidental collisions. This has safety implications during load out and lay of umbilicals, which involve the following operations: load out from manufacturer's facilities onshore, transpooling from one vessel to another, manoeuvring through and into restricted spaces, e.g. underdeck carousels, deck openings and tensioners, lifting to a considerable height and changing orientation to enter and pass through VLS towers.

It would be desirable to simplify the laying process whilst using the same equipment and skills already present in the industry. It would be beneficial to reduce vessel duration and reduce the number of mobilisations and requirements for special tools. It would be desirable to avoid or reduce wet storage and rerouting of umbilical ends

SUMMARY

The invention provides a subsea umbilical laying method, comprising mechanically coupling an umbilical termination assembly at an end of a first umbilical to an umbilical termination assembly at an end of a second umbilical, and subsequently deploying the mechanically coupled ends of the first and second umbilical together in a subsea umbilical laying process.

Mechanically coupling may comprise mechanically coupling on an installation vessel (lay vessel). Alternatively, said mechanical coupling comprises mechanically coupling before deploying the first and second umbilicals on an installation vessel. For example they may be coupled in a factory for delivery to an installation vessel The coupled end terminations may be landed subsea together on the sea bed.

The mechanical coupling may comprise one or more of a shackle, a bolt, a gyve, and a pin.

The method may further comprise connecting at least one of said umbilical termination assemblies to a subsea structure using a flying lead.

The method may further comprise connecting said umbilical termination assemblies to each other using a flying lead.

The umbilical termination assemblies may be connected to a subsea structure and/or each other in a single installation procedure.

By means of the present invention, one or more of the following advantages may be achieved.

1. Reduced marine operation cost due to;
a) reduced vessel duration (>20%) and increased flexibility;
b) continued and efficient installation of the next umbilical, since end terminations can be connected on the vessel;
c) installation and tie-in can be performed in one campaign;
d) wet storage and rerouting of umbilical ends before tie-in can be avoided.
e) reduction in vessel schedule dependencies, including fewer mobilizations (vessels and special tools);
f) increased vessel availability, since simple vessels can be used.
g) improved weather utilization, weather window and weather criteria.
2. Reduced structure/manifold cost
3. Simplified interfaces, deliveries and contracts
4. Reduced resource use (engineering & admin.)

BRIEF DESCRIPTION OF DRAWINGS

The invention will now be described in more detail, and by way of example only, with reference to the accompanying drawings, in which:

FIGS. 3A and 3B are alternative arrangements for connecting subsea structures in accordance with the present invention;

DETAILED DESCRIPTION

The present invention proposes mechanically coupling ends of umbilicals for subsea installation. The type or manner of mechanical connection is not limited. Conveniently, the SUTAs may be connected by shackles using the front padeyes or other mechanical structures on the mud mat of the SUTA or any other convenient location on the SUTA. In the present document the term SUTA (or UTA) does not require anything other than an end termination of an umbilical, although it may optionally include other elements. The term shackle, also known as a gyve, is a commonly U-shaped piece of metal secured with a clevis pin or bolt across the opening, or a hinged metal loop secured with a quick-release locking pin mechanism. Shackles are the primary connecting link in all manner of rigging systems, from boats and ships to industrial crane rigging, as they allow different rigging subsets to be connected or disconnected quickly. Thus any simple or complex mechanical linkage can be used. For example, plural shackles or a specially designed mechanical connecting element that might control relative rotation of the ends for example.

The type of umbilical to be connected is also not limited. Thus the system may be one using an integrated service/production umbilical or a system in which the power and communication lines are separated from the hydraulic and chemical lines, with or without a separate service line.

Figure 1:
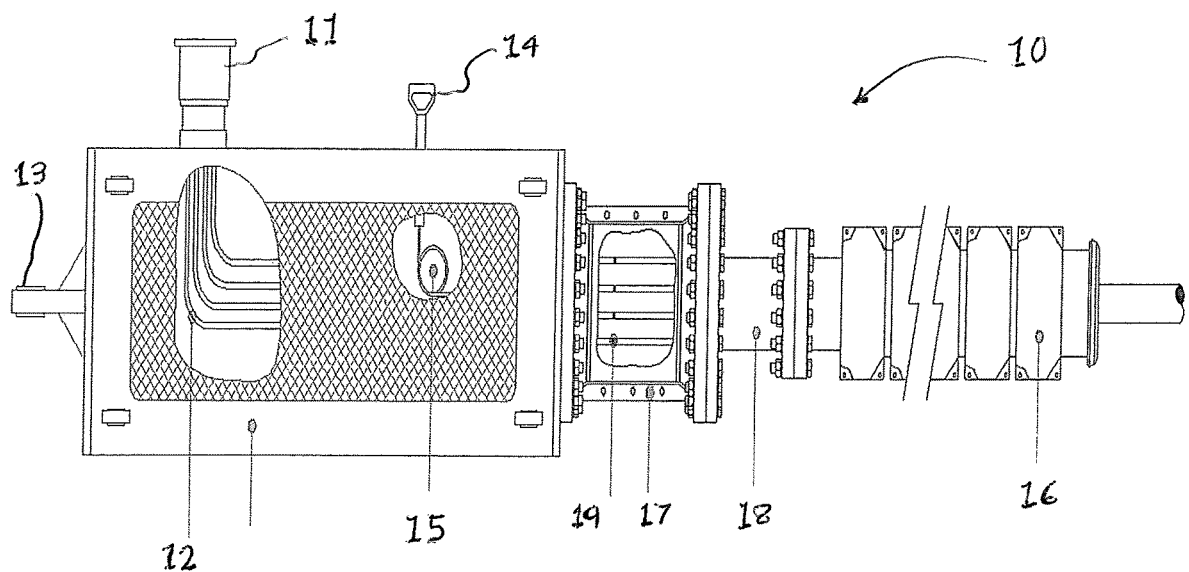
FIG. 1 is a side view of a generic end termination.

FIG. 1 is exemplary of an end termination (10) of a SUTA. A SUTA will typically include an umbilical termination head (UTH) in which the umbilical is permanently terminated, flying leads to connect the UTH to a hydraulic distribution module (HDM), a mud mat foundation assembly, for example with a stab and hinge over mechanism. A stab and hinge over type mud mat is employed when the intention is to connect the umbilical to a subsea distribution unit.

In FIG. 1, the end termination (10) has a full set of connections for distributing electrical power and signals and hydraulic fluids (for example) to the subsea control units. In this case there is an HDM having a hydraulic connector, Multiple Quick Connect (MQC) plate (11). The chemical and hydraulic lines are routed to the MQC plate (11) through tubes (12) shown through a cut away portion of FIG. 1. The end plate or mounting structure has front padeyes (13). An electrical distribution module (EDM) has electrical power and signal connector (14) to which the power and communication lines of the umbilical are routed via cable service loop (15) shown through a cut away portion of FIG. 1. The total length of such an end termination (10) may be approximately 3850 mm. FIG. 1 also shows a bend stiffener or bend restrictor (16) which is part of the umbilical, and a Subsea Termination Interface, which has a transition spool (17) and a strength body (18). Tube welds (19) in the STI are shown in a cut away portion of FIG. 1.

The type of SUTA used is often determined by field architecture.

Figure 2:
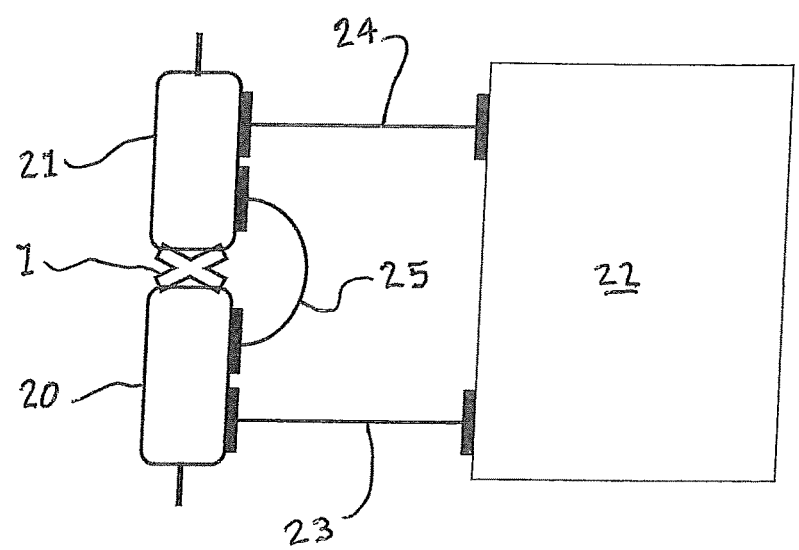
FIG. 2 is a schematic of part of a subsea distribution installed in accordance with the present invention.

FIG. 2 shows schematically the end terminations (20, 21) of two umbilicals, the SUTAs of which are mechanically coupled in accordance with an embodiment of the invention and installed with a subsea structure (22). In this case end termination (20) is connected to a subsea structure (22) by a jumper such as a hydraulic flying lead (23). The end termination (21) is connected to the same subsea structure (22) by a hydraulic flying lead (24). Furthermore, there is a hydraulic flying lead (25) connecting the two end terminations (20, 21).

The mechanical connection (1) between the SUTAs including end terminations (20, 21) is shown schematically. The cross shape is not intended to restrict the shape or configuration of the mechanical connection, or restrict the number of connection points between the two SUTAs. Whilst conveniently one or more shackles can be connected between the front padeyes of the SUTAs, the SUTAs might be designed specifically to be mechanically coupled or a more sophisticated mechanical connection might be designed to connect the SUTAs and control the relative movement of the coupled SUTAs. As will be understood from the explanation above, the coupling of the SUTAs may be loose and they do not need to touch or be kept in any fixed positional relationship—the distance between the two SUTAs may be allowed to vary. The mechanical coupling may allow the distance between the coupled SUTAs to vary between zero and a predetermined maximum, which might be determined by the mechanical coupling arrangement that is selected. In most cases the distance between the two SUTAs will be substantially fixed, especially where a simple mechanical coupling is selected such as one or more shackles.

A mechanical connection by, for example, a single shackle (or a pin between two padeyes) connected at two points (one on each SUTA) might allow freedom of movement in any or all directions but may inhibit rotational movement between the SUTAs to a degree. Using more points of contact or more complex mechanical connections might allow greater control of the rotational movement, but might also increase the complexity of making the mechanical connection. Controlling rotational movement allows the SUTAs to be coupled easily by guaranteeing the correct orientation of the two end terminations.

In embodiments the mechanically connected SUTAs may be connected by one or more Jumpers during the subsea installation process. The maximum distance between the SUTAs may conveniently be a distance that allows the SUTAs to be conveniently connected by a Jumper.

In the arrangement of FIG. 2, for example, HFLs (23, 24) are, for example, 8 line jumpers with MQC connection plates at each end; HFL (25) is, for example, a 12 line jumper with MQC plates at each end.

The arrangement of FIG. 2 could be used in a system in accordance with FIG. 3A. In FIG. 3A, end terminations (20, 21) of first and second umbilicals are installed at a location (30), with the first umbilical providing services to structures (31) at (proximate) that location (30). In this case, the mechanically coupled umbilicals are each constituted by a tube bundle (32), which carries all services except power and communications, which are supplied by a separate DC power and fibre optic cable (DC/FO) (33) with its own end terminations. Each of the fibre optic cables is, for example, spliced off a main power and communication umbilical (not shown).

Tube bundle (32) of the second umbilical extends the provision of services from the first location (30) to a second location (34) where there is a structure or structures (35). The structures (30, 35) may be one or more well production trees connected in series by pipelines for carrying oil or gas. In the embodiment shown in FIG. 3A the structure (35) is the end of the serially connected well production trees; consequently the SUTA (36) at the second location (34) is not mechanically connected to a further umbilical.

Figure 4:
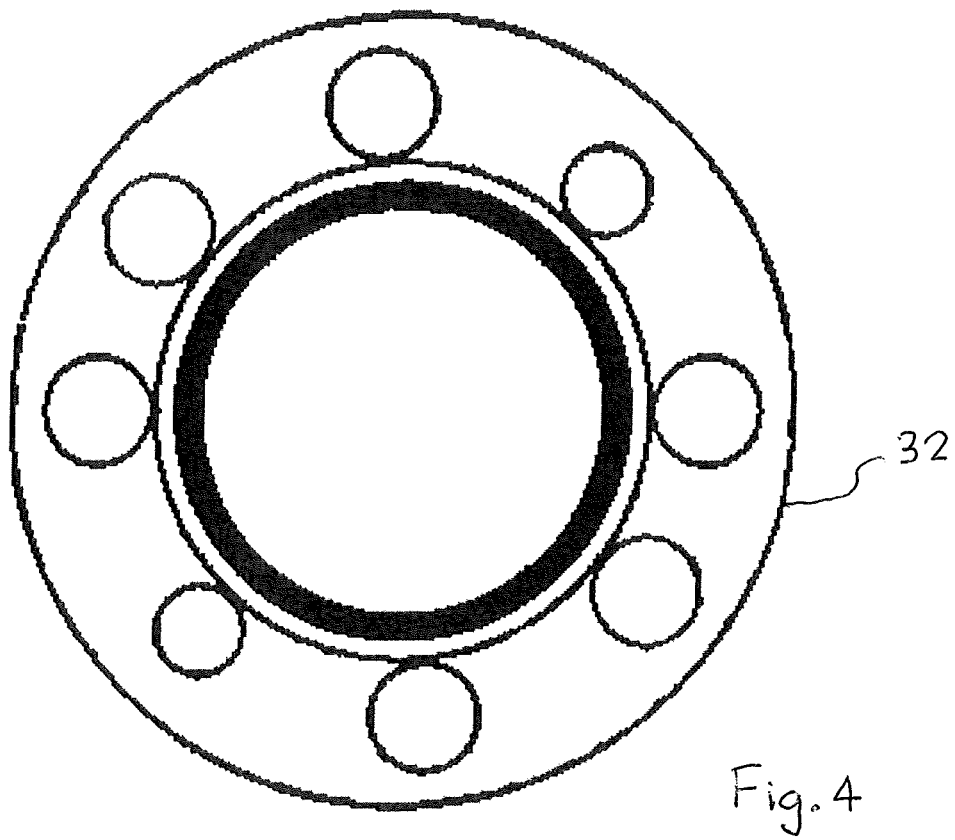
FIG. 4 is a schematic cross-section of an umbilical tube bundle suitable for use in the arrangement of FIG. 3A.

FIG. 4 is a schematic cross section through the umbilical constituting tube bundle (32), which has an integrated fluid line having, for example, a 63.5 mm (2.5 inch) internal diameter. In addition, the tubes and hoses may provide two high pressure hydrulic fluid lines, two low pressure hydraulic fluid linesand four injection and lines for injection of chemicals etc.

Figure 5:
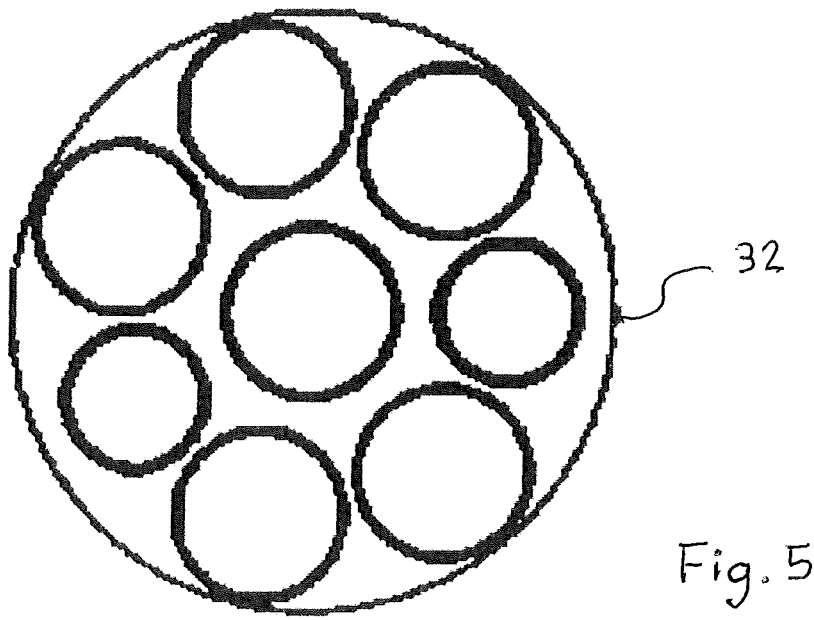
FIG. 5 is a schematic cross-section of an umbilical tube bundle suitable for use in the arrangement of FIG. 3B.

FIG. 3B shows an alternative embodiment to that of FIG. 3A. In this case the large fluid line is provided in a further separate umbilical (37). Again, at least two umbilicals are mechanically connected, as in the arrangement of FIG. 3A, in this case the tube bundles (32). The tube bundle (32) of FIG. 3B is shown in cross section schematically in FIG. 5. Again there are there may be two high pressure and two low pressure hydraulic fluid lines, and four injection or spare lines. In this case there is no large service line since that is provided in a separate umbilical.

Whilst is might be convenient to have a single integrated umbilical carrying all services so that all services can be provided by laying a single umbilical. There are many reasons why this is sometimes impractical or suboptimal. The provision of the tube bundle separately to the power and communications in particularly allows for more flexibility in providing services to different subsea structures.

In the present invention, which is applicable to all subsea umbilicals, when there are no electrical or fibre optic cables in the umbilical then the SUTAs can be smaller and can be more conveniently coupled on the vessel.

In the present invention there is more flexibility in the landing site for the coupled SUTAs since they are not directly ties in to the subsea structure. Instead they are connected by jumpers which are convenient and use is well established in the field of subsea installations generally.

The invention claimed is:

1. A subsea umbilical laying method, comprising:
    mechanically coupling an umbilical termination assembly at an end of a first umbilical to an umbilical termination assembly at an end of a second umbilical; and
    subsequently deploying the mechanically coupled ends of the first and second umbilicals together in a subsea umbilical laying process,
    wherein said method further comprises the steps of:
    connecting said umbilical termination assemblies using a first flying lead; and
    connecting at least one of said umbilical termination assemblies to a subsea structure using a second flying lead.

2. The method as claimed in claim 1, wherein said mechanically coupling comprises mechanically coupling on an installation vessel.

3. The method as claimed in claim 1, wherein said mechanical coupling comprises mechanically coupling before deploying the first and second umbilicals on an installation vessel.

4. The method as claimed in claim 1, wherein the mechanically coupled termination assemblies are landed subsea together on the sea bed.

5. The method as claimed in claim 1, wherein the mechanical coupling comprises one or more of a shackle, a bolt, a gyve, and a pin.

6. The method as claimed in claim 1, wherein said umbilical termination assemblies are connected to the subsea structure and/or each other in a single installation procedure.

7. The method as claimed in claim 1, further comprising the step of connecting the subsea structure to another subsea structure by laying said second umbilical in a single laying process.

8. The method as claimed in claim 1, wherein the step of connecting at least one of said umbilical termination assemblies to the subsea structure using the second flying lead comprises:
    connecting the umbilical termination assembly of the first umbilical to the subsea structure using the second flying lead; and
    connecting the umbilical termination assembly of the second umbilical to the subsea structure using the third flying lead,
    wherein the first, second and third flying leads are different.

9. The method as claimed in claim 8, further comprising the step of connecting the subsea structure to another subsea structure by laying said second umbilical in a single laying process.

* * * * *